(12) United States Patent
Mayhew

(10) Patent No.: US 9,995,004 B2
(45) Date of Patent: Jun. 12, 2018

(54) PAPER PRODUCT WITH BLEED-THROUGH RESISTANT AND SHOW-THROUGH RESISTANT QUALITIES

(71) Applicant: Crescent Cardboard Company, LLC, Wheeling, IL (US)

(72) Inventor: Mays Mayhew, Prospect Heights, IL (US)

(73) Assignee: CRESCENT CARDBOARD COMPANY, LLC, Wheeling, IL (US)

( * ) Notice: Subject to any disclaimer, the term of this patent is extended or adjusted under 35 U.S.C. 154(b) by 162 days.

(21) Appl. No.: 13/669,970

(22) Filed: Nov. 6, 2012

(65) Prior Publication Data
US 2013/0307257 A1 Nov. 21, 2013

Related U.S. Application Data

(60) Provisional application No. 61/648,227, filed on May 17, 2012.

(51) Int. Cl.
*B42D 15/00* (2006.01)
*B42D 1/00* (2006.01)
(Continued)

(52) U.S. Cl.
CPC ............ *D21H 27/36* (2013.01); *B32B 7/12* (2013.01); *B32B 29/005* (2013.01); *B42D 1/008* (2013.01);
(Continued)

(58) Field of Classification Search
CPC . B42D 1/00; B42D 3/04; B42D 19/00; B42D 5/00; B42D 3/00; B42D 15/00;
(Continued)

(56) References Cited

U.S. PATENT DOCUMENTS 2,379,389 A * 6/1945 Tillotson ............... C08L 9/00
524/77
4,675,705 A * 6/1987 Marginean et al. .......... 503/209
(Continued)

FOREIGN PATENT DOCUMENTS

GB 257076 A * 8/1926
WO WO 03072344 A1 * 9/2003 ............ B31F 1/07

OTHER PUBLICATIONS

Converd Blox-Lite® brochure, conVerd LLC, Jan. 26, 2012, 2 pages.

*Primary Examiner* — Justin V Lewis
(74) *Attorney, Agent, or Firm* — Foley & Lardner LLP

(57) ABSTRACT

A sheet of material that reduces or eliminates the incidence of bleed-through and show-through, thereby enabling a user to prepare artwork, sketches, designs, etc. on both sides of the sheet of material, without the incidence of bleed-through or show-through. The sheet of material includes a first substrate, a second substrate, and an adhesive material positioned between the first and second substrates to operatively join the first and second substrates to each other. The adhesive material acts as a moisture barrier, thereby preventing ink or moisture from passing therethrough and saturating the second substrate when ink or moisture is applied to the first substrate and vice versa. The adhesive also serves as a light barrier, thereby reducing or eliminating show-through on the second substrate when ink or moisture is applied to the first substrate and vice versa. Multiple sheets of material may be bound into a sketch book or pad.

20 Claims, 3 Drawing Sheets

(51) Int. Cl.
*B42D 5/00* (2006.01)
*D21H 27/36* (2006.01)
*B32B 7/12* (2006.01)
*B32B 29/00* (2006.01)

(52) U.S. Cl.
CPC .............. *Y10T 428/24975* (2015.01); *Y10T 428/31899* (2015.04); *Y10T 428/31993* (2015.04)

(58) Field of Classification Search
CPC ........ B42D 15/10; B42D 1/008; B29C 65/00; B32B 37/00; B32B 38/14; B32B 29/005; B32B 7/12; B65C 11/02; D21H 27/36; Y10T 428/31993; Y10T 428/31899; Y10T 428/24975
USPC ... 281/2, 3.1, 4, 5, 9, 10, 15.1, 16, 17, 19.1, 281/20, 29, 38; 283/63.1, 72, 94, 95, 98, 283/101, 106, 110; 156/277, 384
See application file for complete search history.

(56) References Cited

U.S. PATENT DOCUMENTS

| | | | | |
|---|---|---|---|---|
| 5,449,200 A | * | 9/1995 | Andric | B32B 27/10 283/67 |
| 6,041,215 A | * | 3/2000 | Maddrell et al. | 434/317 |
| 6,364,360 B1 | * | 4/2002 | Kaufman | A63H 33/38 281/15.1 |
| 7,678,187 B2 | * | 3/2010 | Boersma | C08B 31/18 106/162.1 |
| 8,668,228 B2 | * | 3/2014 | Holmberg | B42D 1/06 281/38 |
| 2003/0077148 A1 | * | 4/2003 | Carter | B42C 9/0006 412/19 |
| 2004/0056476 A1 | * | 3/2004 | Behnen | B42D 5/027 283/61 |
| 2005/0230041 A1 | * | 10/2005 | Morizumi et al. | 283/94 |
| 2006/0034672 A1 | * | 2/2006 | VanDeWalle et al. | 412/33 |

* cited by examiner

PAPER PRODUCT WITH BLEED-THROUGH RESISTANT AND SHOW-THROUGH RESISTANT QUALITIES

CROSS-REFERENCE TO RELATED APPLICATIONS

This application claims the benefit of U.S. Provisional Application No. 61/648,227, filed May 17, 2012 and the contents of which are incorporated by reference herein in its entirety.

BACKGROUND

The present invention relates generally to the field of paper products. More particularly, the present invention relates to paper for use by artists, either as individual sheets or rolls or as part of sketch books, sketch pads, or the like.

Various types of artists prepare their artwork on "artist grade" paper. The precise form of the paper may vary. The paper may be marketed and sold in individual sheets, as larger rolls of paper, or bound in sketch books or sketch pads. One issue associated with such paper products in the art context involves bleed-through and show-through of ink. As used herein, "bleed-through" refers to the situation where ink has been applied to one side of the paper and "bleeds through" to the other side of the paper, often rendering the second side of paper substantially unusable to the artist. "Show-through" refers to the situation where, although the ink does not physically bleed through to the unused side of the paper, a "shadow" of the ink is at least partially visible on the second side of the paper, thereby reducing the usefulness of the second side of paper to the artist.

In the case of bleed-through in particular, this phenomenon can severely inconvenience the artist and result in substantial amounts of wasted paper. In many instances, when the ink is applied to one side of a sheet of paper within a sketch book or sketch pad, the ink will saturate several additional sheets of paper positioned below the sheet to which the ink was applied. For example, sketches on an individual sheet of material are often colored with heavily pigmented markers, but the marker bleeds through two or more additional pages. As a result, not only is the second side of the initial sheet of paper rendered substantially unusable, but other sheets may be damaged as well.

Traditionally, artists have used a number of approaches to address the problems of bleed-through and show-through, but each have their own limitations. A simple approach has been to simply not use the back side of the sheet of paper. However, this approach is wasteful in that it results in the need for additional paper usage. Additionally, this does not address severe bleed-through situations, where unused sheets of material may also be damaged. An alternative approach has been to use the back side of sheets of paper, even after the front side has been used. However, this results in lower quality sketches and artwork on both sides of the paper (due to the occurrence of bleed-through and/or show-through in both directions) and can still result in damage to additional sheets of material. In yet another approach, the artist may use substantially thicker sheets of paper. However, this results in a substantial increase in the cost of the paper and the paper's characteristics may not meet the needs or wishes of the artist.

SUMMARY

Various embodiments provide a sheet of material that substantially reduces or eliminates the incidence of bleed-through and show-through. Individual sheets of material constructed according to various embodiments herein enable a user to prepare artwork, sketches, designs, etc. on both sides of the sheet of material, without the incidence of bleed-through or show-through. As a result, the quality of the artwork on each side of the sheet of material is not compromised by the artwork which has been drawn on the other side of the material. In particular embodiments, a plurality of individual sheets of material may be bound into a sketch book or a sketch pad.

According to various embodiments, a sheet of material comprises a first substrate, a second substrate, and an adhesive material positioned between the first substrate and the second substrate. The adhesive material operatively joins the first and second substrates to each other. The adhesive material acts as a moisture barrier, thereby preventing ink or moisture from passing therethrough and saturating the second substrate when ink or moisture is applied to the first substrate and vice versa. The adhesive possesses a color that serves a light barrier, thereby reducing or eliminating show-through on the second substrate when ink or moisture is applied to the first substrate and vice versa.

These and other features, together with the organization and manner of operation thereof, will become apparent from the following detailed description when taken in conjunction with the accompanying drawings, wherein like elements have like numerals throughout the several drawings described below.

DETAILED DESCRIPTION OF VARIOUS EMBODIMENTS

Figure 1:
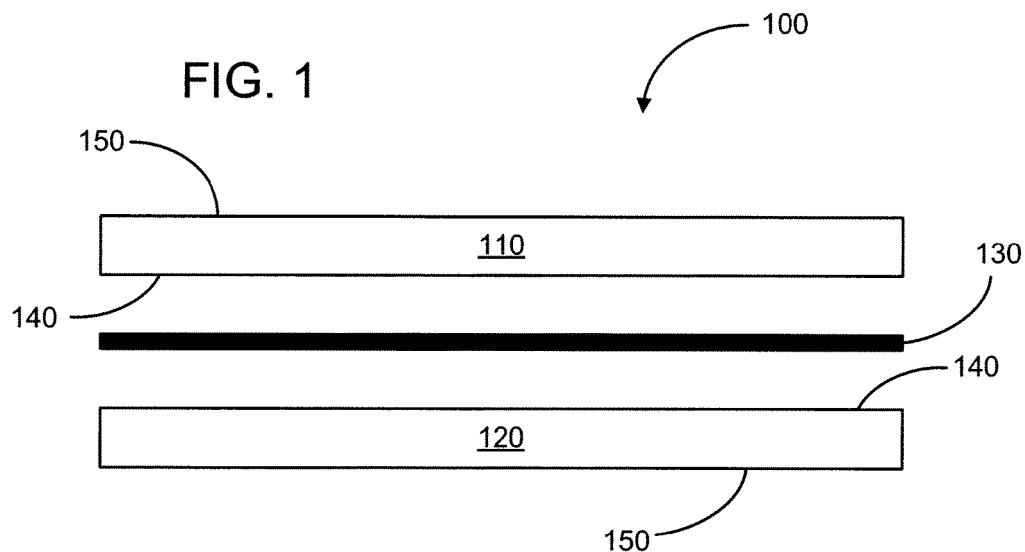
FIG. 1 is a cross-sectional, exploded view of a sheet of paper constructed according to various embodiments.

Various embodiments provide a sheet of material that substantially reduces or eliminates the incidence of ink bleed-through and show-through. FIG. 1 is an exploded, cross-sectional view of a material sheet 100 constructed according to an exemplary embodiment. The material sheet 100 includes a first substrate 110, a second substrate 120, and an adhesive 130 positioned between the first substrate 110 and the second substrate 120. The adhesive 130 operatively joins the first substrate 110 and the second substrate 120 to each other. The adhesive 130 acts as a moisture barrier, thereby preventing ink or moisture from passing therethrough and preventing saturation of the second substrate 120 when ink or moisture is applied to the first substrate 110 and vice versa. The adhesive 130 includes a dark pigment that serves as a light barrier, thereby reducing or eliminating show-through on the second substrate 120 when ink or moisture is applied to the first substrate 110 and vice versa.

In various embodiments, the first substrate 110 and the second substrate 120 comprise a paper material. In particular embodiments, the first substrate 110 and the second substrate 120 each comprise 68-80 gsm, purified wood cellulose paper having a white color and a thickness of about 4-5 mils. In an exemplary embodiment, the first substrate 110 and the second substrate 120 are identical in terms of their composition, color and thickness. However, it is possible for the characteristics of the first substrate 110 and the second substrate 120 to be different from each other.

Both the first substrate 110 and the second substrate 120 include an adhesive application side 140 and an ink application side 150. The adhesive application side 140 comes into contact with the adhesive 130, while the ink application side 150 is the side upon which an artist or otherwise draws, sketches, etc. In various embodiments, the ink application side 150 is devoid of lamination or other surface treatments which may inhibit ink or other drawing media from being successfully applied to the actual substrate. For example, in a particular embodiment the ink application side 150 can be effectively written or drawn on by the artist with both a pencil and a marker. In particular embodiments, the artist may draw on the ink application side 150 using combinations of water color markers, solvent and aqueous-based markers, pencils, wax pencils, pens, crayons, and other drawing or sketching implements that are used to apply compositions including, but not limited to, watercolor, acrylic paint, watercolor paint, other types of paints, inks, pastels, charcoal and graphite to the ink application side 150.

The adhesive 130 is used to join the first substrate 110 and the second substrate 120 to each other. In one embodiment, the adhesive 130 is formed of a butadiene-styrene polymer adhesive with a black gum filler that is used to increase the overall opacity. The adhesive 130 serves as an ink and moisture barrier, thereby preventing ink and moisture from bleeding through the adhesive 130 from the first substrate 110 to the second substrate 120 and vice versa. In particular embodiments, the adhesive's characteristics prevent bleed-through of compositions such as inks from water color markers, solvent and aqueous-based markers, pencils, wax pencils, pens, crayons, and other drawing or sketching implements when normal or even above-normal amounts of pressure are applied by the user during the drawing, painting or sketching process. The adhesive's characteristics also may prevent bleed-through of compositions such as watercolor, acrylic paint, watercolor paint, other types of paints, inks, pastels, charcoal, graphite and other compositions.

The adhesive 130, either through its natural form or via the addition of a predetermined pigmentation, posses a color which serves as a light barrier, thereby reducing or eliminating the visibility of drawings or artwork on the first substrate 110 through the second substrate 120 and vice versa. The resulting color of the adhesive 130 may be selected such that there is no incidence of show-through in typical lighting conditions while, at the same time, the adhesive 130 does not create an undesirable tint or shadow on the first substrate and the second substrate. By way of example, a very dark black adhesive in combination with a very thin, low density white paper used for the first substrate 110 and the second substrate 120 may cause the first substrate 110 and the second substrate 120 to have a darker and more undesirable appearance. In various embodiments, the adhesive possesses a grey color, which effectively serves as a light barrier while also not undesirably tinting the paper. In a particular embodiment, this will result in the finished material sheet 100 having a brightness factor greater than 90 (meaning that more than 90 percent of light is reflected at a wave length of 457 nm) and an opacity level greater than 99.8 (meaning that 99.8 percent of the light is blocked from passing through the sheet).

Although in some embodiments it is desirable to prevent or inhibit the adhesive 130 from causing any sort of discoloration of the first substrate 110 and the second substrate 120, on other embodiments the adhesive 130 may be used to create a slight tinting effect. By way of example, the use of adhesive 130 with a vibrant green color could be used to impart a subtle green tint on normally white paper being used for the first substrate 110 and the second substrate 120. Other color combinations of adhesive 130 and substrates may be used to create other effects.

In particular embodiments, a plurality of individual sheets of material may be bound into a sketch book or a sketch pad. As used herein, a "sketch book" comprises a plurality of sheets of paper or other material bound together, along with a cover bound thereto. The cover may comprise a front cover portion and back cover portion, which may be made from the same or different materials. A "sketch pad" may be considered a particular type of sketch book, where the plurality of sheets of material are bound along a shorter edge of the respective sheets, and wherein the product includes a relatively flexible front and/or bottom cover portions.

Figure 2:
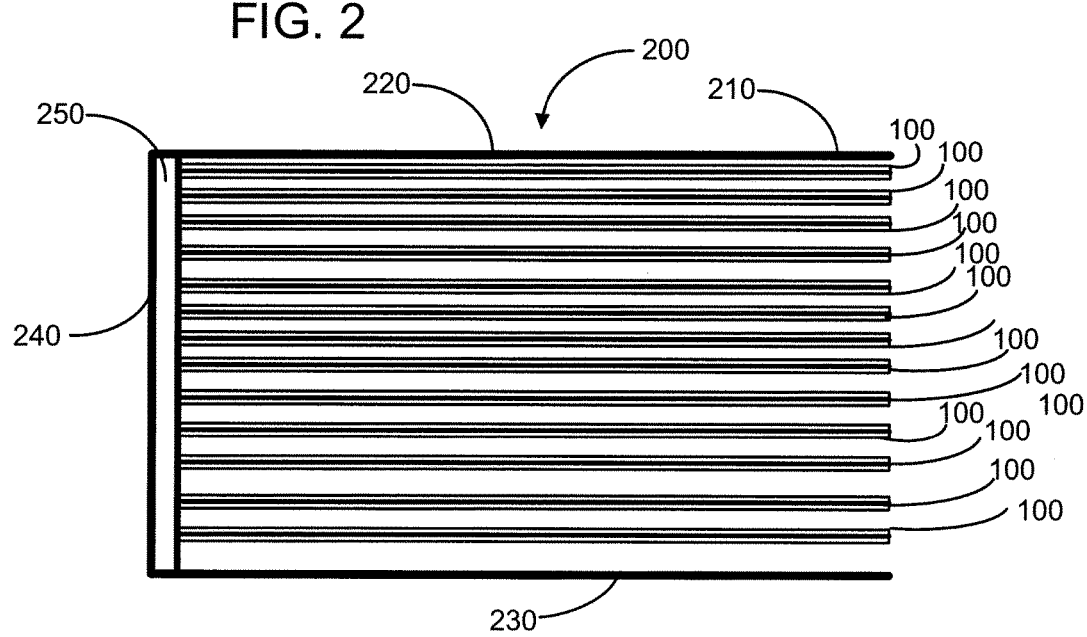
FIG. 2 is a cross-sectional representation of a sketch book including a plurality of sheets of paper constructed according to various embodiments.

FIG. 2 is a cross-sectional view of an exemplary sketch book 200. The sketch book 200 comprises a cover 210 and a plurality of material sheets 100 of the type described herein. The cover 210 includes a top cover portion 220, a bottom cover portion 230, and an intermediate cover portion 240 which directly joins the top cover portion 220 and the bottom cover portion 230. It should be noted that, while the individual material sheets 100 are shown as not being in contact with each other in the sketch book of FIG. 200, this arrangement is depicted for ease of reading, and in many embodiments the material sheets 100 will be in direct contact with the immediately adjacent material sheets 100.

In the particular sketch book 200 in FIG. 2, the cover 210 is constructed of a rigid material as an integral item, with the cover 210 having a substantially uniform composition. However, it is also possible for the cover 210 to be constructed from two or more different components which are physically joined together, and it is also possible for the cover 210 to have a nonuniform composition. In a particular embodiment, some or all of the cover 210 is quite stiff, thereby providing a firm base for the user when drawing on individual material sheets 100. A binding 250 physically binds the cover and the plurality of material sheets 100. A variety of conventional processes known in the art may be used to create the binding 250 and to effectively bind the sketch book 200.

In the case where the sketch book 200 is a sketch pad, the top cover portion 220 of the cover 210 may comprise a flexible material, for example a paper having a greater stiffness and/or density than the material sheets 100 contained therein, while still being sufficiently flexible for a user to quickly and easily move it out of the way during the drawing process. The bottom cover portion 230 may comprise a stiffer material, such as cardboard, thereby providing a relatively firm base for the user during the drawing process (particularly in situations where the user cannot rest the sketch pad on a table or other hard surface). In a particular implementation, the binding 250 of the sketch pad is located along a "shorter" edge of the individual material sheets 100. For example, if the sketch pad comprises 8.5"×11" sheets of paper, then the binding 250 is located along one of the two sides measuring 8.5". Of course, other arrangements and configurations are also possible.

Figure 3:
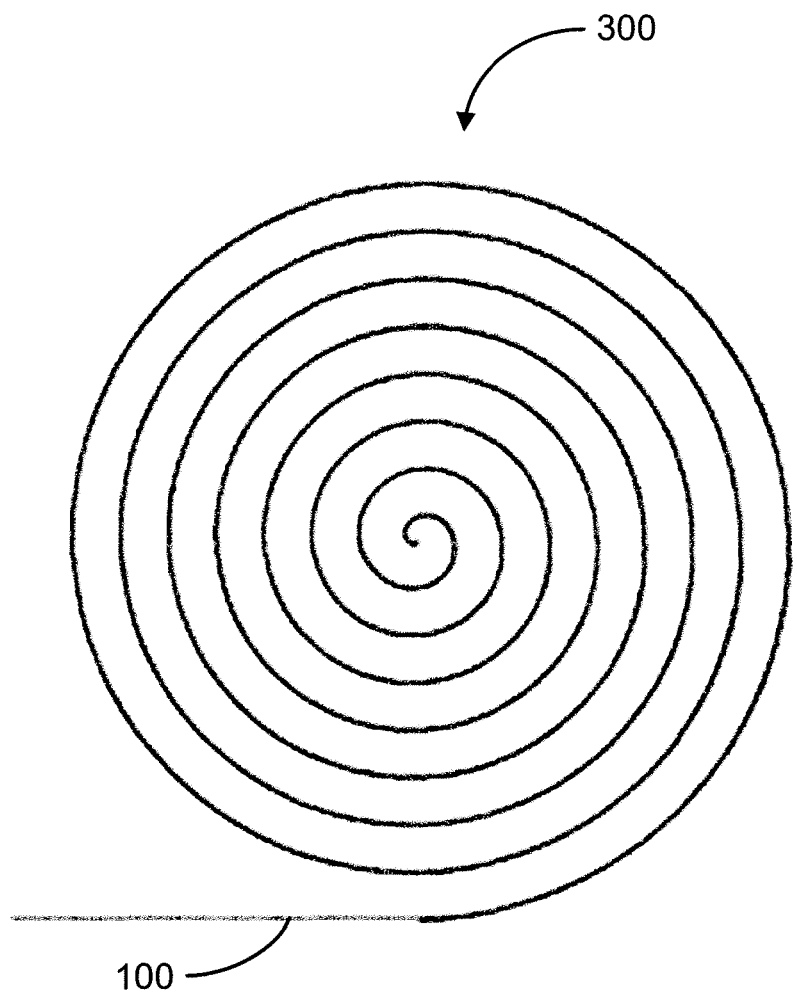
FIG. 3 is a cross-sectional representation of a roll of paper constructed according to a particular embodiment.

FIG. 3 is a cross-sectional representation of a material roll 300 constructed according to a particular embodiment. The material roll 300 comprises a single material sheet 100 constructed in accordance with the teachings herein, with the first substrate 110, the second substrate 120, and the adhesive 13 (best shown in FIG. 1) joining the first substrate 110 and the second substrate 120 to each other. It should be noted that the material roll 300 is depicted in FIG. 3 such that it appears that the material sheet 100 does not contact itself within the roll. The material roll 300 is depicted in this manner for ease of understanding, and it should be recognized that material roll 300 will be tightly would upon itself according to various embodiments. A portion of the material roll 300 may be used to create banners and the like, and the construction of the material roll 300 using the material sheet 100 allows users to effectively create a banner with a clean and unblemished appearance on both sides thereof. Additionally, in the situation where the banner is to be placed on a wall, the material sheet 100 described herein inhibits the ink from bleeding through the adhesive 130 and subsequently blemishing the wall.

Figure 4:
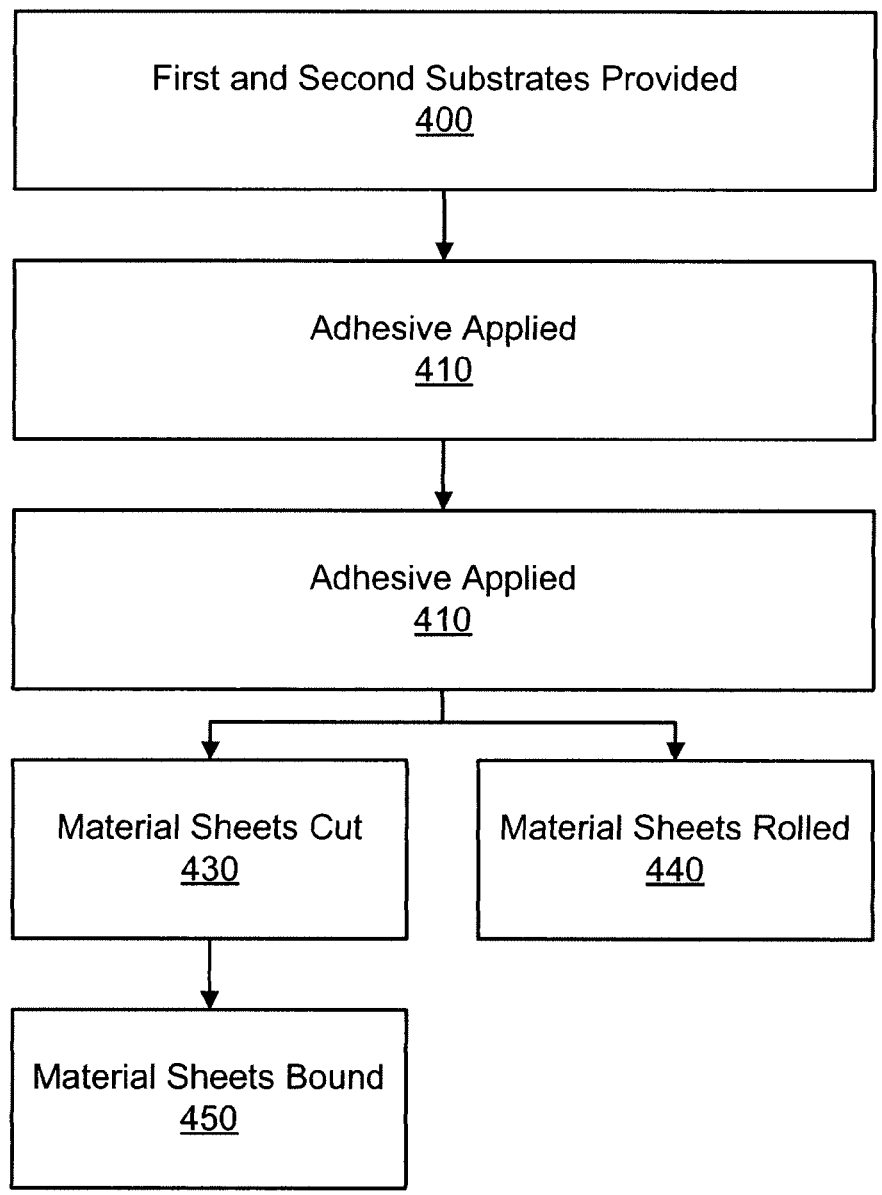
FIG. 4 is a flow chart showing an exemplary process by which a sheet of paper may be constructed according to various embodiments.

FIG. 4 is a flow chart showing an exemplary process by which a sheet of paper may be constructed according to various embodiments. At 400 in FIG. 5, the first substrate 110 and the second substrate 120 are provided. At 410, the adhesive 130 is applied to the adhesive application side 140 of both the first substrate 110 and the second substrate 120. At 420, the first and second substrates are joined to each other using the applied adhesive 130. The resulting material sheet 100 is then cut to the desired size (at 430) or would into rolls 300 (at 440). In certain implementations, after the material sheet 100 has been cut to the desired size, at 450 a plurality of the constructed material sheets 100 are bound into a sketch book 200 or a sketch pad. Other methods of constructing the material sheets 100, sketch books 200 and sketch pads are also possible.

A wide variety of artists may receive benefits through the use of sheets of material constructed according to the embodiments described herein. By way of example, graffiti writers, fashion illustrators, comic illustrators, traditional artists, fashion designers, industrial designers and art students may benefit due to the fact that they can use both sides of individual sheets of material without occurrences of bleed-through or show-through. Such benefits may also extend to other individuals as well, including writers, journalists, engineers and anyone else who uses sketch books and/or sketch pads to write down ideas or concepts.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The foregoing description of embodiments of the present invention have been presented for purposes of illustration and description. The foregoing description is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments and with various modifications as are suited to the particular use contemplated.

What is claimed is:

1. A sheet of material, comprising:
   a first paper substrate including a first ink application surface, the first ink application surface being writable upon by a user;
   a second paper substrate including a second ink application surface, the second ink application surface being writable upon by the user; and
   an adhesive material disposed between the first and second paper substrates and joining the first paper substrate to the second paper substrate, the adhesive material substantially preventing ink from passing therethrough from the first paper substrate to the second paper substrate when the user manually applies ink to the first ink application surface, the adhesive material possessing a color that is a light barrier between the first paper substrate and the second paper substrate resulting in no incidence of show-through between the first paper substrate and the second paper substrate, and wherein an opacity level of the sheet is greater than 99.8 percent.

2. The sheet of material of claim 1, wherein the adhesive material comprises a butadiene-styrene polymer adhesive with a colored gum filler.

3. The sheet of material of claim 1, wherein the color of the adhesive material results in a tinting of an appearance of the first paper substrate and the second paper substrate.

4. The sheet of material of claim 1, wherein the color of the adhesive material results in the first paper substrate and the second paper substrate possessing a brightness factor greater than 90.

5. The sheet of material of claim 1, wherein the adhesive material possesses a gray color.

6. The sheet of material of claim 1, wherein the first and second ink application surfaces are devoid of lamentation or other surface treatments.

7. A sheet of material, comprising:
   a first paper substrate including a first ink application surface, the first ink application surface being writable upon by a user;
   a second paper substrate including a second ink application surface, the second ink application surface being writable upon by the user; and
   an adhesive material joining the first paper substrate to the second paper substrate, the adhesive material substantially preventing ink from passing therethrough from the first paper substrate to the second paper substrate when the user manually applies ink to the first ink application surface, the adhesive material possessing a color that is a light barrier between the first paper substrate and the second paper substrate resulting in no incidence of show-through between the first paper substrate and the second paper substrate,
   wherein the first paper substrate and the second paper substrate each comprise purified wood cellulose paper having a paper density in a range of about 68-80 gsm.

8. The sheet of material of claim 7, wherein the first paper substrate and the second paper substrate each have a thickness in a range of about 4-5 mils.

9. The sheet of material of claim 1, wherein the adhesive material possesses a black color.

10. A book, comprising:

a cover;

a plurality of sheets of material, each of the plurality of sheets including:

a first paper substrate including a first ink application surface, the first ink application surface being writable upon by a user, a second paper substrate including a second ink application surface, the second ink application surface being writable upon by the user; and an adhesive material disposed between the first and second paper substrates and joining the first paper substrate to the second paper substrate, the adhesive material substantially preventing ink from passing therethrough from the first paper substrate to the second paper substrate when the user manually applies ink to the first ink application surface, the adhesive material possessing a color that is a light barrier between the first paper substrate and the second paper substrate resulting in no incidence of show-through between the first paper substrate and the second paper substrate; and a binding coupling the plurality of sheets of material to an inner surface of the cover.

11. The book of claim 10, wherein the cover comprises a top cover portion, a bottom cover portion, and an intermediate portion, and wherein the top cover portion and the bottom cover portion share a same composition.

12. A book, comprising:

a cover;

a plurality of sheets of material, each of the plurality of sheets including:

a first paper substrate including a first ink application surface, the first ink application surface being writable upon by a user, a second paper substrate including a second ink application surface, the second ink application surface being writable upon by the user; and an adhesive material joining the first paper substrate to the second paper substrate, the adhesive material substantially preventing ink from passing therethrough from the first paper substrate to the second paper substrate when the user manually applies ink to the first ink application surface, the adhesive material possessing a color that is a light barrier between the first paper substrate and the second paper substrate resulting in no incidence of show-through between the first paper substrate and the second paper substrate; and a binding coupling the plurality of sheets of material to an inner surface of the cover, wherein the cover comprises a top cover portion, a bottom cover portion, and an intermediate portion, and wherein the top cover portion and the bottom cover portion have different compositions.

13. The book of claim 10, wherein each of the plurality of sheets of material have a rectangular shape comprising a pair of opposing shorter edges and a pair of opposing longer edges, and wherein the binding couples each sheet of material to the cover along one of the pair of shorter edges.

14. The book of claim 10, wherein the adhesive material comprises a butadiene-styrene polymer adhesive with a colored gum filler.

15. The book of claim 10, wherein the color of the adhesive material results in a tinting of an appearance of the first paper substrate and the second paper substrate.

16. The book of claim 15, wherein the adhesive material possesses a black color.

17. The book of claim 10, wherein the color of the adhesive material results in the first paper substrate and the second paper substrate possessing a brightness factor greater than 90.

18. The book of claim 17, wherein the adhesive material possesses a gray color.

19. A book, comprising:

a cover;

a plurality of sheets of material, each of the plurality of sheets including:

a first paper substrate including a first ink application surface, the first ink application surface being writable upon by a user, a second paper substrate including a second ink application surface, the second ink application surface being writable upon by the user; and an adhesive material joining the first paper substrate to the second paper substrate, the adhesive material substantially preventing ink from passing therethrough from the first paper substrate to the second paper substrate when the user manually applies ink to the first ink application surface, the adhesive material possessing a color that is a light barrier between the first paper substrate and the second paper substrate resulting in no incidence of show-through between the first paper substrate and the second paper substrate; and a binding coupling the plurality of sheets of material to an inner surface of the cover, wherein the first paper substrate and the second paper substrate for each of the plurality of sheets of material each comprise purified wood cellulose paper having a paper density in a range of about 68-80 gsm.

20. The book of claim 19, wherein the first paper substrate and the second paper substrate for each of the plurality of sheets of material each have a thickness in a range of about 4-5 mils.

* * * * *